United States Patent
Gadgil et al.

(10) Patent No.: US 11,341,624 B2
(45) Date of Patent: May 24, 2022

(54) REDUCING BANDING ARTIFACTS IN HDR IMAGING VIA ADAPTIVE SDR-TO-HDR RESHAPING FUNCTIONS

(71) Applicant: Dolby Laboratories Licensing Corporation, San Francisco, CA (US)

(72) Inventors: Neeraj J. Gadgil, San Jose, CA (US); Guan-Ming Su, Fremont, CA (US); Qiang Zhu, College Park, MD (US); Qing Song, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/267,369

(22) PCT Filed: Aug. 7, 2019

(86) PCT No.: PCT/US2019/045541
§ 371 (c)(1),
(2) Date: Feb. 9, 2021

(87) PCT Pub. No.: WO2020/033573
PCT Pub. Date: Feb. 13, 2020

(65) Prior Publication Data
US 2021/0350511 A1    Nov. 11, 2021

Related U.S. Application Data

(60) Provisional application No. 62/717,070, filed on Aug. 10, 2018.

(30) Foreign Application Priority Data

Aug. 10, 2018 (EP) .................................... 18188468

(51) Int. Cl.
*G06T 5/00* (2006.01)

(52) U.S. Cl.
CPC .... *G06T 5/009* (2013.01); *G06T 2207/20021* (2013.01); *G06T 2207/20072* (2013.01); *G06T 2207/20208* (2013.01)

(58) Field of Classification Search
CPC ........... G06T 5/00; G06T 5/20; H04N 19/117; H04N 19/98
See application file for complete search history.

(56) References Cited

U.S. PATENT DOCUMENTS 10,032,262 B2   7/2018   Kheradmand
10,223,774 B2   3/2019   Kadu
(Continued)

FOREIGN PATENT DOCUMENTS

EP    3340167 A1    6/2018
JP    2013541895 A   11/2013
(Continued)

OTHER PUBLICATIONS

Q. Song, G. Su and P. C. Cosman, "Hardware-efficient debanding and visual enhancement filter for inverse tone mapped high dynamic range images and videos," 2016 IEEE International Conference on Image Processing (ICIP), 2016, pp. 3299-3303, doi: 10.1109/ICIP.2016.7532970.*

(Continued)

*Primary Examiner* — Li Liu

(57) ABSTRACT

Methods and systems for reducing banding artifacts when displaying high-dynamic-range images are described. Given an input image in a first dynamic range, and an input backward reshaping function mapping codewords from the first dynamic range to a second dynamic range, wherein the second dynamic range is equal or higher than the first dynamic range, statistical data based on the input image and the input backward reshaping function are generated to estimate the risk of banding artifacts in a target image in the second dynamic range generated by applying the input (Continued)

backward reshaping function to the input image. Separate banding alleviation algorithms are applied in the darks and highlights parts of the first dynamic range to generate a modified backward reshaping function, which when applied to the input image to generate the target image eliminates or reduces banding in the target image.

20 Claims, 6 Drawing Sheets

(56) References Cited

U.S. PATENT DOCUMENTS

| | | | |
|---|---|---|---|
| 2016/0125579 A1* | 5/2016 | Song | H04N 19/117 382/261 |
| 2017/0078706 A1* | 3/2017 | Van Der Vleuten | H04N 19/46 |
| 2018/0098094 A1 | 4/2018 | Wen | |
| 2019/0104309 A1* | 4/2019 | Su | H04N 19/37 |

FOREIGN PATENT DOCUMENTS

| JP | 2014531821 A | 11/2014 |
|---|---|---|
| JP | 2018026794 A | 2/2018 |
| WO | 2018231968 | 12/2018 |
| WO | 2019169174 | 9/2019 |

OTHER PUBLICATIONS

B. Wen and G. -M. Su, "Transim: Transfer Image Local Statistics Across EOTFS for HDR Image Applications," 2018 IEEE International Conference on Multimedia and Expo (ICME), 2018, pp. 1-6, doi: 10.1109/ICME.2018.8486582.*

Chen, Qian, Guan-Ming Su, and Peng Yin. "Near constant-time optimal piecewise LDR to HDR inverse tone mapping." Digital Photography XI. vol. 9404. International Society for Optics and Photonics, 2015.*

ITU-R BT. 2100 "Image Parameter Values for High Dynamic Range Television for Use in Production and International Programme Exchange" ITU, Jul. 2016.

Pu, F. et al. "Comments on Reshaping for HDR/WCG Compression" ISO/IEC JTC1/SC29/WG11 MPEG2015/M37267, Oct. 2015, Geneva, Switzerland.

SMPTE 2084:2014 "High Dynamic Range Electro-Optical Transfer Function of Mastering Reference Displays" Aug. 16, 2014.

* cited by examiner

REDUCING BANDING ARTIFACTS IN HDR IMAGING VIA ADAPTIVE SDR-TO-HDR RESHAPING FUNCTIONS

CROSS-REFERENCE TO RELATED APPLICATIONS

This application claims priority to U.S. Provisional Patent Application No. 62/717,070, filed Aug. 10, 2018 and European Patent Application No. 18188468.5, filed Aug. 10, 2018, each of which is hereby incorporated by reference in its entirety.

TECHNOLOGY

The present document relates generally to images. More particularly, an embodiment of the present invention relates to reducing banding artifacts in reconstructed high-dynamic range (HDR) images via proper adaptation of standard-dynamic range (SDR) to HDR reshaping functions.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

As used herein, the term "banding" (also referred to as "color banding") refers to a visual artifact in imaging and video where shades of the same color are displayed as bands of varying luminance. When visible, banding is visually annoying and is often considered an indicator of low-quality encoding or of a low-quality display. As appreciated by the inventors here, improved techniques for reducing banding when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
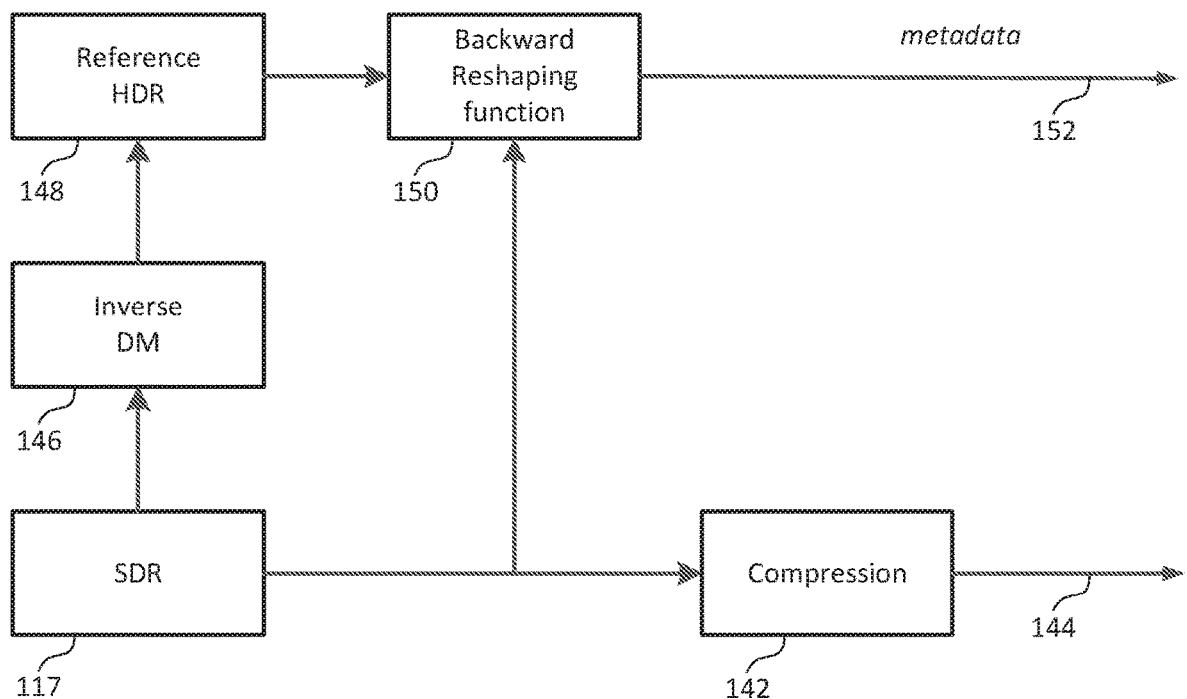
FIG. 1A depicts an example single-layer encoder for HDR data using a reshaping function according to an embodiment of this invention.

Reducing banding artifacts in HDR image and video content by proper adaptation of a reshaping image-mapping function is described herein. Given an SDR image and a backward reshaping function, an updated reshaping function is derived so that an output HDR image generated by applying the updated reshaping function to the input image has reduced or no banding artifacts. In the following description, for the purposes of explanation, numerous specific details are set forth in order to provide a thorough understanding of the various embodiments of the present invention. It will be apparent, however, that the various embodiments of the present invention may be practiced without these specific details. In other instances, well-known structures and devices are not described in exhaustive detail.

SUMMARY

Example embodiments described herein relate to reducing banding artifacts in HDR pictures. In an embodiment, an encoder or a decoder receives an input backward reshaping function which maps codewords from a first dynamic range to a second dynamic range, wherein the second dynamic range is equal or higher than the first dynamic range. The encoder or decoder receives also an input image in the first dynamic range. It generates statistical data based on the input image and the input backward reshaping function to estimate the risk of banding artifacts in a target image in the second dynamic range, wherein the target image is generated by applying the input backward reshaping function to the input image. It divides the first dynamic range into a darks range and a highlights range, and estimates the banding risk in the darks range and the highlights range based on the statistical data. Banding risk values represent a chance of having banding artifacts for the bins in the darks range and the bins in the highlights. The banding risk values are computed from a difference between a first value and a second value. The first value is computed from a number of codewords for reconstructing the target image with no banding artifacts and on the statistical data. The second value is computed from a number of allocated codewords for the bins in the second dynamic range. The method comprises generating an output backward reshaping function by adjusting a slope of the input backward reshaping function for the codeword bins in the darks range and/or highlights range for which the difference is positive, for reducing the banding artifacts in the target image, and compensating the adjusted slope of the input backward reshaping function for the remaining codeword bins in the darks range and/or highlights range for which the difference is not positive, for preserving the second dynamic range in the target image.

The method further comprises replacing the input backward reshaping function with the output backward reshaping function. When the output backward reshaping function is applied to the input image the generated output image (i.e. target image) has reduced or no banding artifacts.

The method may be performed at an encoder or decoder side. For example, the output backward reshaping function may be generated at an encoder or decoder side.

When the method is performed in an encoder, the output backward reshaping function may be sent to the decoder (e.g. by a bitstream of metadata). When the method is performed in a decoder, the output backward reshaping function may be directly used at the decoder to reconstruct the target image at the decoder side.

The input backward reshaping function may be applied before encoding the data, e.g. to obtain the encoded target image. The output backward reshaping function may be applied after decoding the data, e.g. to obtain the decoded target image with banding artifacts reduction.

In an embodiment, generating the output backward reshaping function involves applying darks-banding alleviation function and/or a highlights-banding alleviation function to generate an output backward reshaping function based on the statistical data and the input backward reshaping function.

In an embodiment, if the difference in a full range of the target image is positive, then the output backward reshaping function is generated.

In an embodiment, if the difference in a full range of the target image is not positive, then the step of generating the output backward reshaping function is skipped.

In an embodiment, generating statistical data based on the input image and the input backward reshaping function comprises generating estimates of luminance standard deviation values (or variance values) in the target image by computing standard deviations of luminance values in the input image and computing corresponding luminance standard deviation values (or variance values) in the second dynamic range based on the input backward reshaping function.

In an embodiment, the luminance values are grouped in bins and the standard deviations are computed for each bin.

In an embodiment, computing standard deviations of luminance values in the input image comprises computing a histogram of luminance values in the input image, dividing the input image into non-overlapping blocks, computing block-based standard deviations of the luminance values for one or more of the image blocks, computing bin-based standard deviation values (or variance values) for each bin in the first dynamic range based on the block-based standard deviations, computing normalized bin-based standard deviation values (or variance values) for each bin based on the histogram of luminance values and the bin-based standard deviation values (or variance values).

In an embodiment, computing corresponding standard deviation values (or variance values) in the second dynamic range based on the input backward reshaping function comprises: for each bin in the first dynamic range, computing its normalized range in the second dynamic range based on the input backward reshaping function, and generating bin-based estimates of luminance standard deviation values (or variance values) in a reconstructed image in the second dynamic range by scaling the normalized bin-based standard deviation values (or variance values) based on the bin's normalized range in the second dynamic range.

In an embodiment, adjusting the slope of the input backward reshaping function in the highlights range comprises: determining a start value of an alleviation range within the highlights range based on the smaller bin value in the highlights range with a positive difference, and adjusting the slope of an existing backward reshaping function within the alleviation range.

In an embodiment, compensating the adjusted slope of the input backward reshaping function in the highlights range comprises: determining a loss-of-brightness value due to the adjustment of the slope of the existing backward reshaping function in the alleviation range, determining a start value for a recovery range spanning bins in the first dynamic range between the start value of the first dynamic range and the start value of the alleviation range, determining a polynomial for brightness preservation based on the loss of brightness value, and adjusting the slope of the existing backward reshaping function within the recovery range based on the polynomial for brightness preservation.

In an embodiment, if the slope of the input backward reshaping function in the darks range is not adjusted, then the existing backward reshaping function comprises the input backward reshaping function, else the existing backward reshaping function comprises the output backward reshaping function generated for the codeword bins in the darks range.

Example HDR Coding System

Figure 1B:
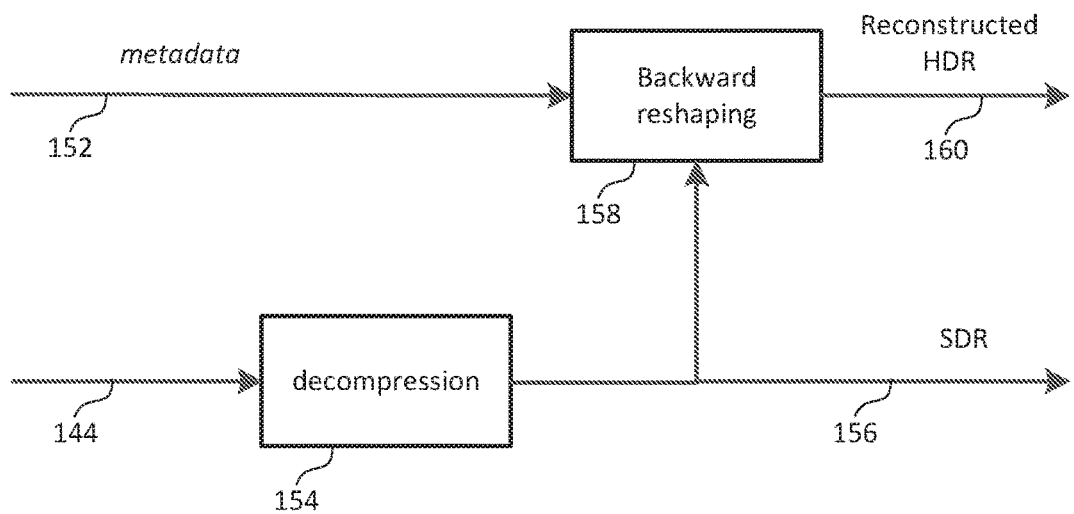
FIG. 1B depicts an example HDR decoder corresponding to the encoder of FIG. 1A, according to an embodiment of this invention.

As described in U.S. patent application Ser. No. 15/725,101, (the '101 Application') "Inverse luma/chroma mappings with histogram transfer and approximation," by B. Wen, et al., filed on Oct. 4, 2017, and published as U.S. Patent Application Publication U.S. 2018/0098094, which is incorporated herein by reference in its entirety, FIG. 1A and FIG. 1B illustrate an example single-layer inverse display management (SLiDM) codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, SDR content (117) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward reshaping metadata (152) is also encoded and transmitted in the video signal with the SDR content so that HDR display devices can reconstruct HDR content based on the SDR content and the backward reshaping metadata.

In some embodiments, as illustrated in FIG. 1A, backward compatible SDR images, such as the SDR images (117), are received as input on the encoder side of the codec framework. Here, "backward compatible SDR images" may refer to SDR images that are specifically optimized or color graded for SDR displays.

A compression block 142 (e.g., an encoder implemented according to any known video coding algorithms, like AVC, HEVC, AV1, and the like) compresses/encodes the SDR images (117) in a single layer 144 of a video signal. By way of illustration but not limitation, an inverse dynamic-range mapping (DM) module 146 which may represent an SDR-to-HDR conversion tool—is used to convert the SDR images (117) to reference HDR images 148. In some embodiments, the inverse-DM module may also be referred to as an inverse tone-mapping tool. In some embodiments, instead of converting the SDR images (117) to the target HDR images (148), the HDR content (148) may be derived directly from the same source/input video content used to derive the SDR images (117) (not shown).

Regardless of whether the target HDR images (148) are derived from the SDR images (117) or not, a backward reshaping function generator 150 receives both of the SDR images (117) and the reference HDR images (148) as input, performs optimization to find out optimal backward reshaping functions such that backward reshaped images generated by backward reshaping the SDR images (117) with the optimal backward reshaping functions are as close to the reference HDR images (148) as possible. The optimal backward reshaping functions may be represented or specified with backward reshaping metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse DM coefficients/parameters, etc. In various embodiments, luma backward reshaping functions and chroma backward reshaping functions may be derived/optimized jointly or separately, may be derived using cumulative distribution functions (CDF) histogram approximation/transfer techniques, and may be derived using a variety of techniques as described in the '101 Application and/or in PCT Application Ser. No. PCT/US2018/037313, filed on Jun. 13, 2018, "Efficient end-to-end single layer inverse display management coding," by N. J. Gadgil et al., which is incorporated herein by reference in its entirety.

The backward reshaping metadata (152), as generated by the backward reshaping function generator (150) based on the SDR images (117) and the target HDR images (148), may be multiplexed as part of the video signal 144.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (117) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (148) into coded/compressed HDR images in the video signal; instead, the backward reshaping metadata (152) in the video signal can be used to enable downstream decoding devices to backward reshape the SDR images (117) (which are encoded in the video signal) into reconstructed images that are identical to or closely/optimally approximate the reference HDR images (148).

In some embodiments, as illustrated in FIG. 1B, the video signal encoded with the SDR images (117) in the single layer (144) and the backward reshaping metadata (152) as a part of the overall image metadata are received as input on the decoder side of the codec framework. A decompression block 154 decompresses/decodes compressed video data in the single layer (144) of the video signal into the decoded SDR images (156). Decompression 154 typically corresponds to the inverse of compression 142. The decoded SDR images (156) may be the same as the SDR images (117), subject to quantization errors in the compression block (142) and in the decompression block (154), which may have been optimized for SDR display devices. The decoded SDR images (156) may be outputted in an output SDR video signal (e.g., over an HDMI interface, over a video link, etc.) to be rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (148). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Example System for Reducing Banding Artifacts

Figure 2:
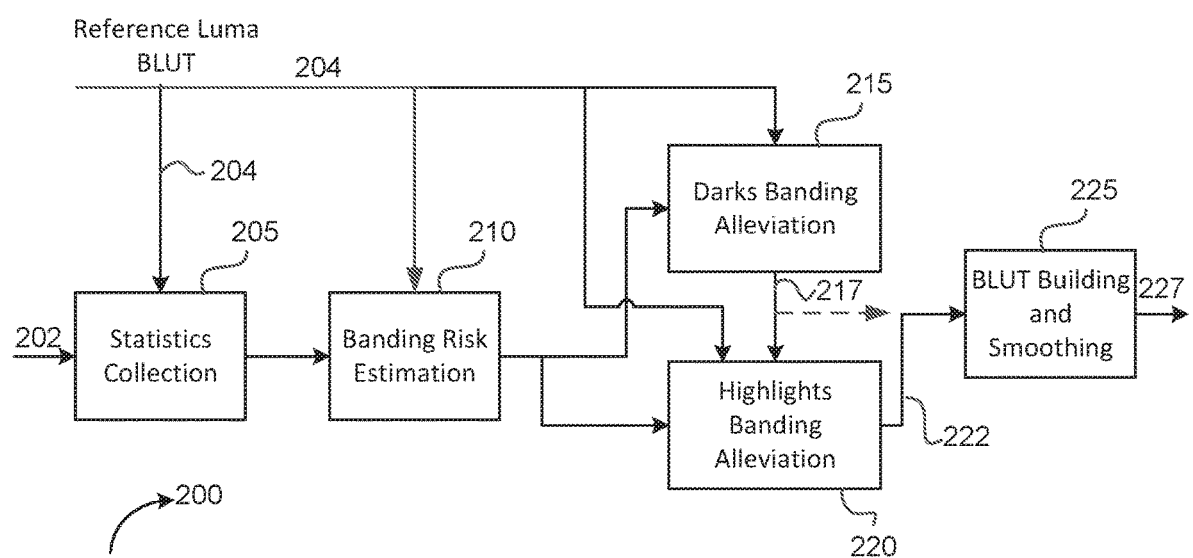
FIG. 2 depicts an example process for reducing banding artifacts according to an embodiment of this invention.

FIG. 2 depicts an example data flow (200) for reducing banding artifacts according to an embodiment. As depicted in FIG. 2, the inputs to this workflow are an SDR image (202) (e.g., part of the input video sequence 117) and a reference backward look-up table (BLUT) or backward reshaping function 204, (e.g., one designed according to block 150 described earlier). The process will construct a new BLUT (227), which when applied to the SDR data in decoder (e.g., see FIG. 1B) will reduce banding in the resulting HDR image.

The proposed method works with any valid reference BLUT which is designed to be applied on an SDR image to produce HDR output. For example, one condition for a valid BLUT requires that a reshaping function must be monotonically non-decreasing. Hence the proposed methodology is agnostic of the method used to generate the reference BLUT (204).

The proposed method will also work if the input SDR image (202) is replaced by a VDR or HDR image of lower dynamic range than the target HDR image (e.g., HDR image 160).

Let $I_S$ be the input SDR image having P luma pixels of $s_{bits}$ bit depth. The total number of SDR codewords is given by $N_S=2^{s_{bits}}$. Let this luma codeword space be divided in $N_L$ bins (e.g., $N_L=64$) containing equal number of codewords in each bin. Let $(s_b^L, s_b^H)$ be the minimum and maximum SDR codeword in bin b. Note that $s_b^H=s_{b+1}^L-1$ for all but the last bin. Let $T^{REF}$ be the reference backward look-up table (BLUT) for $I_S$. Note that, without limitation, $T^{REF}$ specifies a reference mapping from an SDR codeword to its corresponding normalized (between 0 and 1) HDR codeword. In this document, s denotes a codeword index and b denotes a bin index.

Statistics Collection

In block 205, statistical data are collected from the SDR input (202) and the input BLUT (204) or $T^{REF}$ as follows.
a) Compute $h^{N_s}$, a luma histogram of the SDR input.
Let $s_i^{y,n}$ denote the normalized value between 0 and 1, of the i-th luma pixel in $I_S$, then Table 1 provides in pseudocode an example histogram implementation:

TABLE 1

Input SDR histogram computation

```
// histogram initialization
  h_s^{N_s} = 0 for s = 0, ..., N_s - 1
// scan for each pixel in SDR to build histogram
  for (i = 0; i < P; i ++)
    s = ⌊s_i^{y,n} · N_s⌋
    h_s^{N_s} ++        // histogram for luma SDR
  end
``` b) Compute $\overline{\sigma}_b^S$, a block-based metric of SDR standard deviation in the $N_L$ luma bins.

Let the image $I_S$ containing P pixels be composed of non-overlapping square blocks of $w_B \times w_B$ luma pixels (e.g., $w_B=4$). In total, there are $$N_B = \frac{P}{(w_B \times w_B)}$$

non-overlapping blocks in the input image. For an image where its horizontal or vertical dimension is not divisible by $w_B$, one may exclude its fractional pixel-blocks as one scans the image in raster-scan order. For example, one may exclude the right-most column and/or the bottom-most row of fractional blocks. Let $B_j^P$ be the j-th non-overlapping block of $I_S$. Let $s_{k,j}^{y,n}$ be the k-th normalized luma pixel value between 0 and 1, in the j-th block of pixels. Also, let $h_b^{N_L}$ be the $N_L$-bin luma histogram of $I_S$. Let $\overline{\mu}^{S,j}$ and $\overline{\sigma}^{S,j}$ be the block luma mean and standard deviation for $B_j^P$:

$$\mu^{S,j} = \frac{1}{w_B^2} \sum_{k \in B_j^P} s_{k,j}^{y,n}, \tag{1}$$

$$\sigma^{S,j} = \sqrt{\frac{1}{w_B^2} \sum_{k \in B_j^P} (s_{k,j}^{y,n})^2 - (\mu^{S,j})^2}.$$

Given $N_L$ luma bins, an example algorithm for computing statistical data (e.g., mean, variance, or standard deviation) for each block $B_j^P$ is depicted in Table 2.

TABLE 2

Collection of block-based standard deviations in luma bins

```
// initialization
  h_b^{N_L} = 0     for b = 0, 1, ... , N_L -1 // luma histogram
  σ̄_b^S = 0       for b = 0, 1, ... , N_L -1// standard deviation in luma bins
```

TABLE 2-continued

Collection of block-based standard deviations in luma bins

```
// collect total block-based standard deviation in luma bins
for (j = 0; j < N_B ; j++)
    // compute block standard deviation
    μ̄^{S,j} = σ̄^{S,j} = 0
    for (each k ∈ B_j^P)
        μ̄^{S,j} += s_{k,j}^{y,n}
        σ̄^{S,j} += (s_{k,j}^{y,n})^2
end
```

$$\bar{\mu}^{S,j} = \frac{s_{k,j}^{y,n}}{w_B^2}$$

$$\bar{\sigma}^{S,j} = \sqrt{\frac{\bar{\sigma}^{S,j}}{w_B^2} - (\bar{\mu}^{S,j})^2}$$

```
    // assign standard deviation to luma bins
    for (each k ∈ B_j^P)
        // find the luma bin index for k-th pixel in the j-th block
        b = ⌊s_{k,j}^{y,n} · N_L⌋           // quantization of codewords into N_L bins
        // collect luma histogram for N_L bins
        h_b^{NL} += 1
        // collect j-th block standard deviation to its corresponding luma bin
        σ̄_b^S += σ̄^{S,j}
    end
end
// normalize total block standard deviation in luma bins with luma histogram
for (b = 0; b < N_L; b++)
    if ( h_b^{NL} > 0)
```

$$\bar{\sigma}_b^S = \frac{\bar{\sigma}_b^S}{h_b^{N_L}}$$

```
    else
        σ̄_b^S = INVALID
    end
end
```

In Table 2, the term INVALID denotes that the value for a parameter is not defined or not valid. For practical purposes, this may simply be a large negative value.

c) Compute $R_b^V$, the normalized HDR range in each of the SDR luma bins. In this step, $T^{REF}$, the reference BLUT, is used to compute $R_b^V$, the normalized HDR range corresponding to each SDR luma bin. Let $$R_b^V = T_{s_b H}^{REF} - T_{s_b L_{-1}}^{REF}. \quad (2)$$

The first bin may be handled differently, since there is no codeword for −1 and the HDR range is computed from $s_0^L = 0$ to $s_0^H$. For all other bins, the HDR range is computed from $s_b^L - 1$ to $s_b^H$. Table 3 provides an example implementation.

TABLE 3

Computation of $R_b^V$

```
// assign normalized HDR range for the first bin
    R_0^V = T_{s_0 H}^{REF} - T_{s_0 L}^{REF}
// assign for each bin b its normalized HDR range for the remaining N_L − 1 bins
    for (b = 1; b < N_L − 1 ; b ++)
        R_b^V = T_{s_b H}^{REF} - T_{s_b L −1}^{REF}
End
```

Let $s_{min}^{sig}$ and $s_{max}^{sig}$ be the minimum and maximum SDR codeword of the active signal codeword-range which refers to either a full range (e.g. [0, $2^{S_{bits}}-1$]) or the narrower SMPTE range (e.g., [16, 235] for 8-bit data).

$$(s_{min}^{sig}, s_{max}^{sig}) = \begin{cases} (0, N_S - 1) \\ \left(0.0625N^S, 0.0625N^S + \left(\frac{219}{256}\right)N_S - 1\right) \end{cases} \quad (3)$$

Let $b_{min}^{sig}$ and $b_{max}^{sig}$ be the start and end indices of bins that contain the active signal min and max codewords. $R_b^V=0$ for all non-signal bins, because there are no HDR codewords allocated outside the signal range (this is mainly applicable to the SMPTE range). Let $N_b^{CW}$ be the number of signal codewords in bin b.

$$N_b^{CW} = \begin{cases} s_{b_{min}^{sig}}^H - s_{min}^{sig} + 1 & \text{if } b = b_{min}^{sig} \\ s_b^H - s_b^L + 1 & \text{if } b_{min}^{sig} < b < b_{max}^{sig} \\ s_{max}^{sig} - s_{b_{max}^{sig}}^L + 1 & \text{if } b = b_{max}^{sig} \end{cases} \quad (4)$$

One may simply use $N^{CW}$ if referring to the non-boundary case of number of codewords in each luma bin. The SMPTE range is the most common case, thus it has been used in some of the examples.

Estimation of Banding Risk

Given the statistical data collected in step 205, step 210 in FIG. 2 computes a measure of "banding risk." When this measure is positive, then banding alleviation schemes (e.g., steps 215 and 220), to be described in more detail later, may be applied, otherwise these steps may be skipped.

Let $\hat{\sigma}_b^V$ be an estimate of the standard deviation in the reconstructed HDR signal in luma bin b, considering a full-range signal. For the bins with $\bar{\sigma}_b^S$=INVALID, because no SDR codewords fall into such bins, then $\hat{\sigma}_b^V$=INVALID as well. Let $\hat{\zeta}_b^V$ be the estimated number of HDR codewords required to avoid banding in luma bin b in the uncompressed HDR signal. Let $\hat{\chi}_b^V$ be the estimated banding risk in luma bin b. In an embodiment, $\hat{\sigma}_b^V$ values may be estimated in each signal bin using a statistical transfer equation based on the computed $\bar{\sigma}_b^S$ and $R_b^V$ values. For example, one may use the local slope of $T^{REF}$ in bin b to map $\bar{\sigma}_b^S$ to $\hat{\sigma}_b^V$. A scale factor, denoted as sc_factor, value may be used to convert the SMPTE range to a full range, since the full range HDR signal is desired for the next step. For SDR SMPTE signals, $$\text{sc\_factor} = \left(\frac{256}{219}\right). \text{ Let } N_b^{CW,n}$$

be the number of normalized SDR codewords in bin b. Thus, for each bin b, given $$N_b^{CW,n} = \left(\frac{N_b^{CW,n}}{N_s}\right), \quad (5)$$

$$\hat{\sigma}_b^V = \text{sc\_factor} \cdot \frac{R_b^V}{N_b^{CW,n}} \cdot \bar{\sigma}_b^S, \quad (6)$$

where $$\frac{R_b^V}{N_b^{CW,n}}$$

represents the local slope of $T^{REF}$ in bin b. This equation converts SDR standard deviation values for a particular luma range into the standard deviation in the resulting HDR signal when $T^{REF}$ is applied on the SDR signal. Intuitively, $\hat{\sigma}_b^V$ denotes the value of standard deviation for the HDR content generated as a result of the b-th SDR luma bin content, adjusted (if needed) for the SMPTE range. For input signals in the full range sc_factor=1.

Let $\hat{\zeta}_b^V = f(\hat{\sigma}_b^V, R_b^V)$ be defined as a function of $\hat{\sigma}_b^V$ and $R_b^V$, that maps for each signal bin b, the HDR standard deviation and the HDR range to a required number of codewords to avoid banding. In an embodiment, given the standard deviation of the signal, one may use the experimental mapping table used in U.S. patent application Ser. No. 15/648,125, "Single pass and multi-pass-based polynomial approximations for reshaping functions," by H. Kadu et al., filed on Jul. 12, 2017, also published as U.S. Patent Application Publication Ser. No. 2017/0308996, and incorporated herein by reference, to estimate the required number of codewords to represent the HDR signal to avoid banding. Then, $\hat{\chi}_b^V$, the banding risk estimate for bin b, can be derived as the difference between $\hat{\zeta}_b^V$, the required number of HDR codewords to avoid banding, and $N_b^{CW}$ the number of HDR codewords in b, or $$\hat{\chi}_b^V = \hat{\zeta}_b^V - N_b^{CW}. \quad (7)$$

Note that for the bins where $\hat{\sigma}_b^V$=INVALID, $\hat{\chi}_b^V$=INVALID as well. The pseudo code for this step is described in Table 4 below:

TABLE 4

Banding Risk Estimation

// set look-up table and a method to convert HDR standard dev. to
codeword lower bound
$\hat{\sigma}^{V,EXP}$ = [0 0.0002 0.0050 0.05 1]
$\hat{\zeta}^{V,EXP}$ = [2000 1500 900 200 200]
//initialize
$\hat{\sigma}_b^V$ = INVALID, for all bins b=0,1,..., $N_L$-1
$\hat{\zeta}_b^V$ = INVALID, for all bins b=0,1,..., $N_L$-1
// determine scaling factor for statistic conversion
if (signal range == full)
  sc_factor = 1
else if (signal range == SMPTE)

$$\text{sc\_factor} = \left(\frac{256}{219}\right)$$

end
// transfer std dev statistics from SDR to HDR
for (b = $b_{min}^{sig}$ ; b ≤ $b_{max}^{sig}$ ; b++)
  // convert std dev SDR to HDR in each SDR luma bin $$\hat{\sigma}_b^V = \text{sc\_factor} \cdot \frac{\bar{\sigma}_b^S \cdot R_b^V}{\left(\frac{N_b^{CW}}{N_s}\right)}$$

// obtain the lower bound on codewords based on HDR std dev
for each bin
$\hat{\zeta}_b^V = R_b^V \cdot$ [interpolate_table_lookup ($\hat{\sigma}^{V,EXP}, \hat{\zeta}^{V,EXP}, \hat{\sigma}_b^V$)]
// obtain banding risk estimates for each bin
$\hat{\chi}_b^V = \hat{\zeta}_b^V - N_b^{CW}$
end The procedure interpolate_table_lookup( ) gives an interpolated output value using simple linear interpolation of the experimental mapping data: $\hat{\sigma}^{V,EXP}$, $\hat{\zeta}^{V,EXP}$ pairs (e.g., see Table 4) and the input $\hat{\sigma}_b^V$ value. ($\hat{\sigma}^{V,EXP}$, $\hat{\zeta}^{V,EXP}$) pair is a mapping between the HDR standard deviation for the full HDR range (between 0 and 1) and its corresponding required number of codewords to avoid banding. Each computed $\hat{\sigma}_b^V$ corresponds to a $R_b^V$, a part of HDR codeword range as derived using $T^{REF}$.

Intuitively, when $N_b^{CW}$ the number of codewords from $T^{REF}$ in a bin b is less than $\hat{\zeta}_b^V$, the minimum number of codewords needed to avoid banding, $\hat{\chi}_b^V$, the banding risk, turns out to be positive. It implies that there is probably a visual appearance of banding while watching the content from that luma bin of the HDR image. The higher the value of $\hat{\chi}_b^V$, the higher are the chances of banding in its corresponding luminance range. Alternatively, when $N_b^{CW}$ for the bin b is higher than $\hat{\zeta}_b^V$, this means that the number of allocated codewords in $T^{REF}$ for the b-th bin is more than the estimated number of codewords required to avoid banding. Hence this part of $T^{REF}$ is marked as "banding-safe," implying it will not cause visual appearance of banding in the resulting HDR image. Hence the goal of this step is to identify and quantify the potential banding in HDR image for each SDR luma bin. The lower bound on the number of codewords for each bin can also be computed in terms of $\hat{\zeta}_b^V$.

Banding Alleviation

Figure 3:
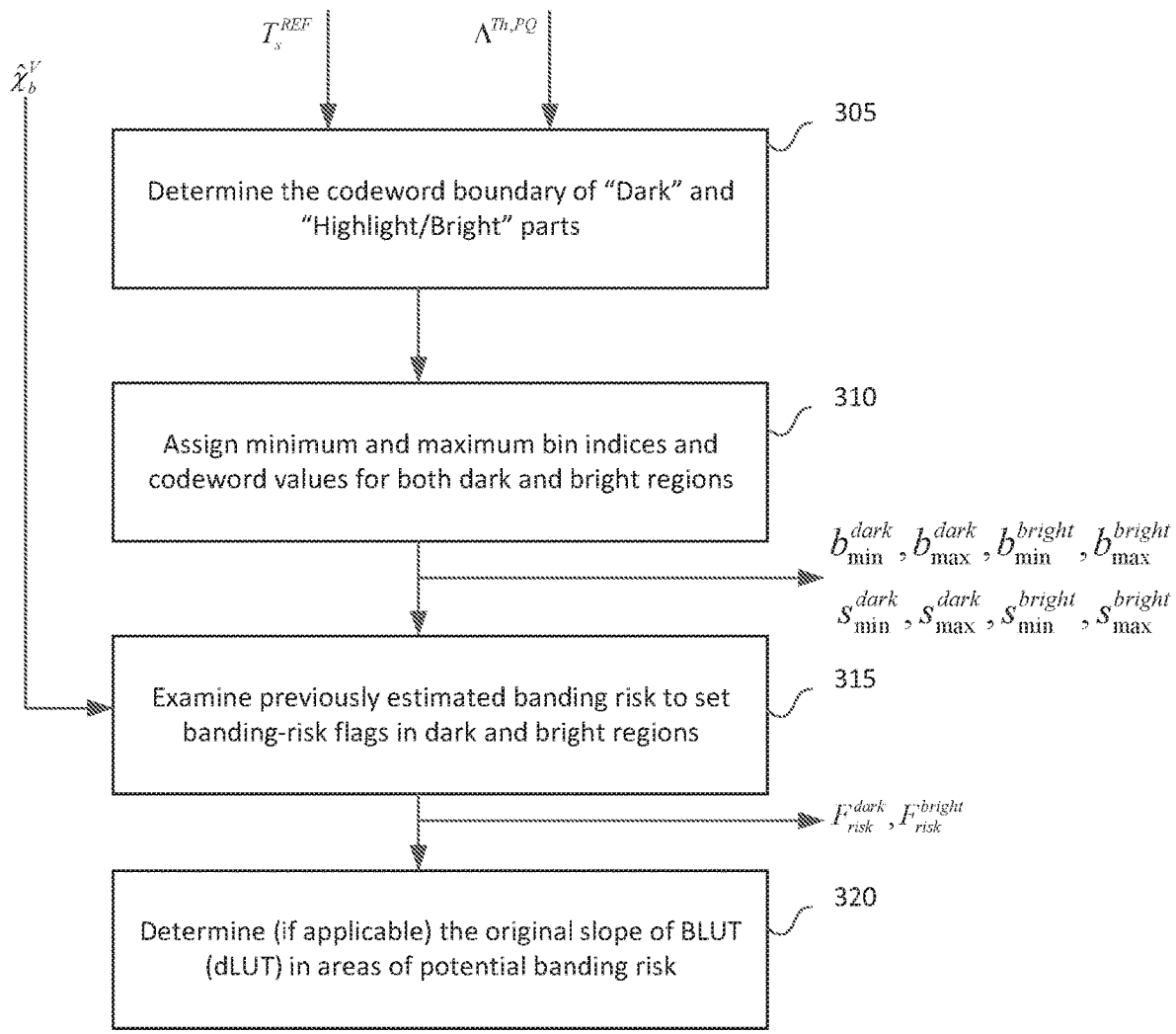
FIG. 3 depicts an example process for deriving parameters related to reducing banding artifacts according to an embodiment of this invention.

As appreciated by the inventors, it was observed that reducing banding artifacts required different strategies between dark areas (blacks) and the highlights. To reduce banding in the darks, it is important to preserve the reshaping response for higher intensities, otherwise the whole image may look darker. So, the modified BLUT needs to reach the original level of HDR intensity as it reduces banding in the darker regions. One of the main features of HDR image/video reconstruction is its ability to show high levels of intensities, thus there is a desire to maintain the "HDR look" by preserving overall brightness in the highlights part. Therefore, it is important to keep the overall or the "average brightness" unaltered in the affected region while the original BLUT is modified. For example, a simpler solution, such as highlight-clipping, typically is not adequate since it can't preserve the target brightness. Based on these observations, separate algorithms for reducing banding in darks and highlights are proposed, denoted in FIG. 2 as steps 215 and 220 respectively. In block 225, the results from blocks 215 and 220 are merged together to construct the final, modified backward reshaping function (BLUT) (227). Some preliminary steps and notation, applicable to both steps are summarized in FIG. 3 and are described next.

First, the BLUT is split into dark and highlight regions. Assuming PQ-coded data, Let $\Lambda^{Th,PQ}$ be the threshold expressed as a perceptual quantization (PQ) value which when applied on $T^{REF}$ determines the SDR dark and highlight regions (step 305). (If the input SDR is coded using gamma, HLG, or some other EOTF, then an appropriate alternative threshold may be used). Let $S_{min}^{dark}$ and $s_{max}^{dark}$ be the minimum and maximum SDR codeword of the dark part. Let $b_{min}^{dark}$ and $b_{max}^{dark}$ be their corresponding bin indices. Let $s_{min}^{bright}$ and $s_{max}^{bright}$ be the minimum and maximum SDR codeword of the highlights part. Let $b_{min}^{bright}$ and $b_{max}^{bright}$ be their corresponding bin indices. All these values may be derived in step 310. In step 315, the values of $\hat{\chi}_b^V$, the banding risk estimates for the luma bin b, may be used to identify the bins affected by dark and bright banding. Let $F_{risk}^{dark}$ and $F_{risk}^{bright}$ be dark- and bright-banding risk flags indicating (e.g., when set to 1) whether there is a positive $\hat{\chi}_b^V$ value in at least one of the dark and bright bins respectively. Let $b_{risk\_min}^{bright}$ be the lowest bin index at which $\hat{\chi}_b^V>0$ for the bright part. The $F_{risk}^{dark}$, $F_{risk}^{bright}$ and $b_{risk\_min}^{bright}$ values may be derived by checking the $\hat{\chi}_b^V$ values in both the dark and bright parts. Example pseudocode to derive these parameters is shown in Table 5.

TABLE 5

Example algorithm to compute boundary-related parameters between darks and highlights

```
// locate boundary SDR codeword
s = s_min^sig ;
   while (s ≤ s_max^sig)
     if (T^REF (s) ≥ Λ^Th,PQ)
        break;
     end
     s++;
end
// decide highlight (bright) and dark boundaries
if (s == s_min^sig)      // T^REF will produce only highlight content in HDR
     s_min^dark = s_max^dark = b_min^dark = b_max^dark = INVALID
     s_min^bright = s_min^sig , s_max^bright = s_max^sig
     b_min^bright = b_min^sig , b_max^bright = b_max^sig
else if (s > s_max^sig)   // T^REF will produce only dark content in HDR
     s_min^bright = s_max^bright = b_min^bright = b_max^bright = INVALID
     s_min^dark = s_min^sig , s_max^dark = s_max^sig
     b_min^dark = b_min^sig , b_max^dark = b_max^sig
else¹                     // will produce both dark and highlight in HDR
```

$$b_{min}^{dark} = b_{min}^{sig}, b_{max}^{dark} = \left\lfloor \frac{s-1}{NCW} \right\rfloor$$

$$s_{min}^{dark} = s_{min}^{sig}, s_{max}^{dark} = s_{b_{max}^{dark}}^{H}$$

$$b_{min}^{bright} = \min(b_{max}^{dark} + 1, b_{max}^{sig}), b_{max}^{bright} = b_{max}^{sig}$$

$$s_{min}^{bright} = s_{b_{min}^{bright}}^{L}, s_{max}^{bright} = s_{max}^{sig}$$

end

If either of the flags $F_{risk}^{dark}$, $F_{risk}^{bright}$ is set (e.g., to 1), $\delta_s^{REF}$ the original differential LUT (dLUT) from $T_s^{REF}$ needs to be derived in step 320. Intuitively, dLUT represents the "slope" of BLUT in bins of interest (e.g., in the darks or highlights areas marked as having a banding risk). Let $\delta_s^{MOD}$ be the modified dLUT and $T_s^{MOD}$ be the modified BLUT constructed using $\delta^{MOD}$ in order to alleviate banding. The flags $F_{risk}^{dark}$ and $F_{risk}^{bright}$ indicate risk of potential banding in the composed HDR image and trigger the banding-reduction algorithms presented next. An example of building a differential LUT is shown in Table 6.

TABLE 6

Example construction of a differential BLUT (or dLUT)

```
// assign F_risk^dark
   b = b_min^sig ;
   while (b ≤ b_max^dark )
     if ( χ_b^V > 0)
        break;
     end
     b++;
   end
   if (b > b_max^dark )
        F_risk^dark = 0
   else
        F_risk^dark = 1
   end
// assign F_risk^bright and find b_risk_min^bright
   b = b_min^bright ;
```

TABLE 6-continued

Example construction of a differential BLUT (or dLUT)

```
        while (b ≤ b_max^bright )
            if ( χ̂_b^V > 0)
                break;
            end
            b++;
        end
        if (b > b_max^bright )
            F_risk^bright = 0
            b_risk_min^bright = INVALID
        else
            F_risk^bright = 1
            b_risk_min^bright = b
        end
        // construct δ^REF using T^REF (320)
        if (( F_risk^dark == 1) OR ( F_risk^bright == 1))
            for (s = 1; s < N_s ; s ++)
                δ_s^REF = T_s^REF − T_{s−1}^REF
            end
        end
```

Banding Reduction in the Darks

The general idea is to a) decrease the dLUT (or the slope of BLUT) in bins that have positive risk of banding and b) compensate the drop in the HDR intensity level by increasing the dLUT in the risk-free bins. This causes a decrease in the difference of HDR intensities of adjacent bands, alleviating the appearance of bands, thus making the intensity shift smoother.

Figure 4:
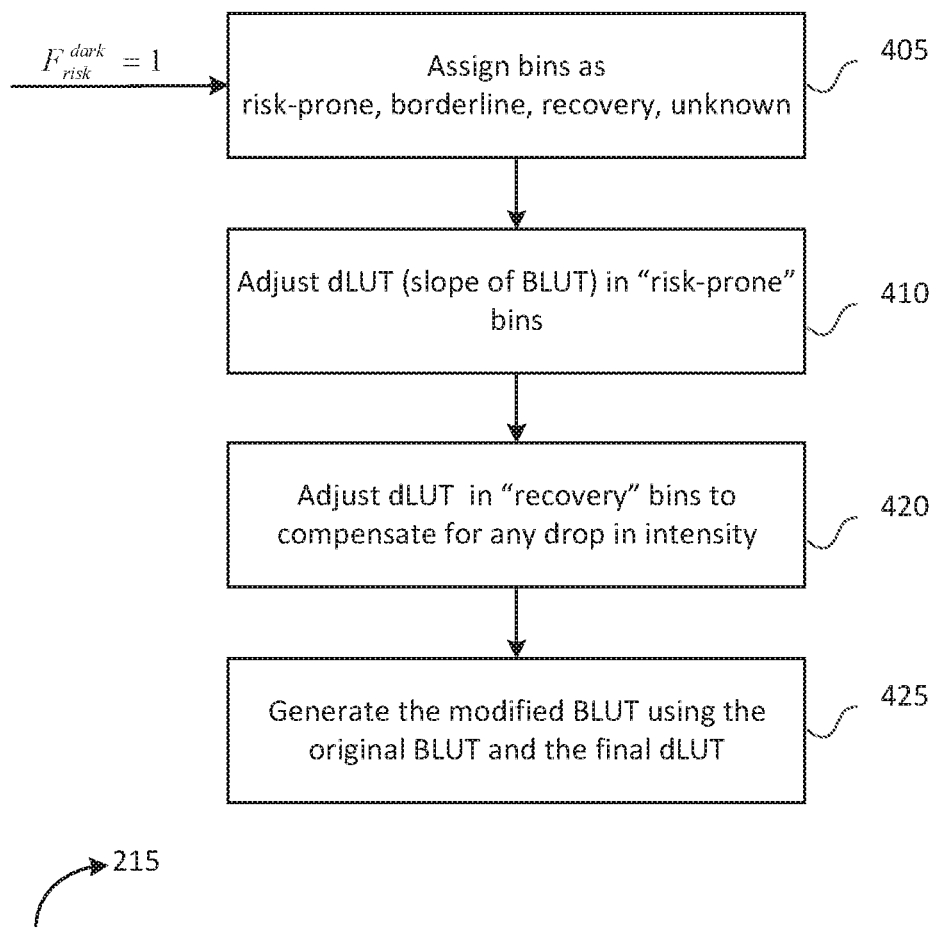
FIG. 4 depicts an example process to alleviate banding in dark regions according to an embodiment of this invention.

In a two pass-approach, as depicted in FIG. 4, in the first pass (steps 405 and 410) the slope of the original BLUT is reduced in all bins characterized as "banding risk-prone." Next, in a second pass (step 420), the remaining codewords are reallocated to compensate for the intensity drop. Finally (step 425), the modified BLUT is generated.

Let $\Delta_{CM}^{dark}$ denote the number of codewords deciding the role flag $F_{role,b}^{dark}$, where each bin is marked as "banding risk prone," "banding risk borderline," or "banding risk unknown." Let $\Delta_{BR}^{dark}$ be the number of codewords to be added to the number of required codewords to reduce banding risk in the risk-prone bins. Then, Table 7 depicts an example set of conditions and the corresponding actions and parameters to be applied in adjusting the differential dLUT (e.g., as part of step 405). In an embodiment, without any limitations, the following empirically chosen parameters are being used: $\Delta_{BR}^{dark}=24$, $\Delta_{CM}^{dark}=4$. In Table 7, optional parameter θ provides an additional level of fine tuning the algorithm. Based on experiments, θ=1.2 yields good experimental results.

TABLE 7

Two-pass banding reduction in the darks-conditions and actions

| $F_{role}^{dark}$ | Condition | | Action | dLUT |
|---|---|---|---|---|
| $\Omega_{risk}^{dark}$ | $\hat{\chi}_b^V > 0$ | | $\delta_b^{MOD} < \delta_b^{REF}$ | $\alpha_{risk}^{dark} = \dfrac{N_b^{CW}}{\hat{\zeta}_b^V + \Delta_{BR}^{dark}}$ |
| $\Omega_{borderline}^{dark}$ | $-\Delta_{CM}^{dark} <$ $\hat{\chi}_b^V \leq 0$ | | $\delta_b^{MOD} = \delta_b^{REF}$ | $\alpha_{borderline}^{dark} = 1$ |
| $\Omega_{recovery}^{dark}$ | $\hat{\chi}_b^V + \Delta_{CM}^{dark}$ $\leq 0$ | | $\delta_b^{MOD} \geq \delta_b^{REF}$ | $\alpha_{recovery}^{dark} = \min\left(\dfrac{N_b^{CW}}{\hat{\zeta}_b^V + \Delta_{CM}^{dark}}, \theta\right)$ |
| $\Omega_{unknown}^{dark}$ | $\hat{\chi}_b^V =$ INVALID | | $\delta_b^{MOD} = \delta_b^{REF}$ | $\alpha_{unknown}^{dark} = 1$ |

As shown in Table 7, for "risk prone" bins, when $\hat{\chi}_b^V$ is positive, the dLUT value needs to be reduced such that $\delta_b^{MOD} < \delta_b^{REF}$. The dLUT multiplier ($\alpha_{risk}^{dark}$) for bin b in this case is dependent on the number of required codewords ($\hat{\zeta}_b^V$), the number of allocated codewords in the reference BLUT ($N_b^{CW}$), and the aggressiveness of banding reduction algorithm ($\Delta_{BR}^{dark}$). The original dLUT value is reduced by using a multiplier defined as the ratio of allocated codewords $N_b^{CW}$ to the required codewords $\hat{\zeta}_b^V$ plus the $\Delta_{BR}^{dark}$. Thus, in recovery bins, the dLUT is adjusted as $\delta_s^{MOD} = \alpha_{risk}^{dark} \cdot \delta_s^{REF}$.

When $\hat{\chi}_b^V \leq 0$, but $\hat{\chi}_b^V + \Delta_{CM}^{dark} > 0$, the content in this luma bin is at borderline risk of banding and hence one cannot increase the dLUT to compensate for the intensity drop.

In case $\hat{\chi}_b^V + \Delta_{CM}^{dark} < 0$, the content in this bin is sufficiently below the banding risk, so the dLUT in this bin can be increased to compensate for the intensity the drop and preserve the non-dark part. So, $\delta_b^{MOD} \geq \delta_b^{REF}$. Thus $\Delta_{CM}^{dark}$ in some way reflects the sensitivity of dLUT modification to the risk detection. Lastly, when there is no information about the risk statistic in a bin, $\delta_b^{MOD} = \delta_b^{REF}$ and no adjustments are made to the original dLUT.

Let Ψ denote the normalized HDR codeword balance. It is initialized as 0, and the goal is to make this balance 0 at the end of dark banding reduction. In the first pass across dark bins, the BLUT slope is reduced in all banding-prone (where risk is positive) bins. In the second pass, the remaining HDR codewords are allocated in the risk free-bins in order to compensate for the intensity drop. This ensures maintaining the HDR look in the non-dark part. Thus, in an embodiment, $\delta_s^{MOD} = \alpha_{recovery}^{dark} \cdot \delta_s^{REF}$.

In few extreme cases, the intensity drop (Ψ) may not be completely recovered, thus leading to Ψ<0 after two passes are done, but this occurrence is typically rare and happens in very poor images that have high amount of dark banding spread over several bins. Table 8 depicts in pseudo code an example implementation of the process depicted in FIG. 4.

TABLE 8

Example implementation of a two-pass banding alleviation method in the darks

```
// Initialize the normalized HDR codeword balance
Ψ = 0
// Pass 1: construct dark banding-alleviating dLUT
for (b = b_min^sig ; b ≤ b_max^sig ; b ++)
    // check the role-flag (step 405)
    switch (F_{role,b}^dark)
        // banding risk avoidance (step 410)
        case (Ω_risk^dark):
```

$$\alpha_{risk}^{dark} = \frac{N_b^{CW}}{\hat{\zeta}_b^V + \Delta_{BR}^{dark}} \qquad \text{// compute dLUT multiplier for risk bin}$$

TABLE 8-continued

Example implementation of a two-pass banding alleviation method in the darks

```
            for (s = s_b^L ; s ≤ s_b^H ; s++)        //construct dLUT for each codeword in bin
                δ_s^MOD = α_risk^dark · δ_s^REF       // decrease dLUT using multiplier
                Ψ = Ψ − (1 − α_risk^dark) · δ_s^REF   // update balance
            end
            break;
        // borderline banding risk: use reference dLUT
        case (Ω_borderline^dark):
        // unknown std dev data: use reference dLUT
        case (Ω_unknown^dark):
            for (s = s_b^L ; s ≤ s_b^H ; s++)         // construct dLUT for each codeword in bin
                δ_s^MOD = δ_s^REF                     //Unity multiplier α_borderline^dark = α_unknown^dark = 1
            end
            break;
        // recover balance (compensate intensity drop)
        case ( Ω_recovery^dark ):
            // Do nothing in the first pass
            break;
    end
end
// Pass 2: construct dLUT to recover intensity drop of Ψ
for (b = b_min^sig ; b ≤ b_max^sig ; b++)
    // check the role-flag
    switch (F_role,b^dark)
        // recover balance (compensate intensity drop) (step 420)
        case (Ω_recovery^dark):
            if (Ψ<0)                                  // balance is negative, need to compensate
                s = s_b^L
```

$$\alpha_{recovery}^{dark} = \min\left(\frac{N_b^{CW}}{\xi_b^V + \Delta_{CM}^{dark}},\ \theta\right)\quad \text{// compute dLUT multiplier for recovery bin}$$

```
                // construct dLUT for each codeword in bin
                while (s ≤ s_b^H AND Ψ < 0)
                    // increase dLUT using multiplier
                    δ_s^MOD = α_recovery^dark · δ_s^REF
                    Ψ = Ψ + (α_recovery^dark − 1) · δ_s^REF     // update balance
                    s++
                end
                if (Ψ≥0)                              // balance is 0: intensity drop compensated in this bin
                    while (s ≤ s_b^H )                // use reference dLUT for the rest codewords
                        δ_s^MOD = δ_s^REF
                        s++
                    end
                end
            else                                      // balance is not negative, no need to compensate
                for (s = s_b^L ; s ≤ s_b^H ; s++)     // use reference dLUT
                    δ_s^MOD = δ_s^REF
                end
            end
            break;
        // borderline banding risk: use reference dLUT
        case (Ω_borderline^dark):
        // unknown std dev data: use reference dLUT
        case (Ω_unknown^dark):
        // banding risk avoidance
        case (Ω_risk^dark):
            // Do nothing in the second pass
            break;
    end
end
// construct BLUT based on dLUT (step 425)
for (s = 0; s < s_min^dark ; s ++ )
    T_s^MOD = T_s^REF
end
for (s = s_min^dark ; s < s_max^dark + 1; s ++)
    T_s^MOD = T_{s−1}^MOD + δ_{s−1}^MOD
end
```

Banding Reduction in the Highlights

Figure 5:
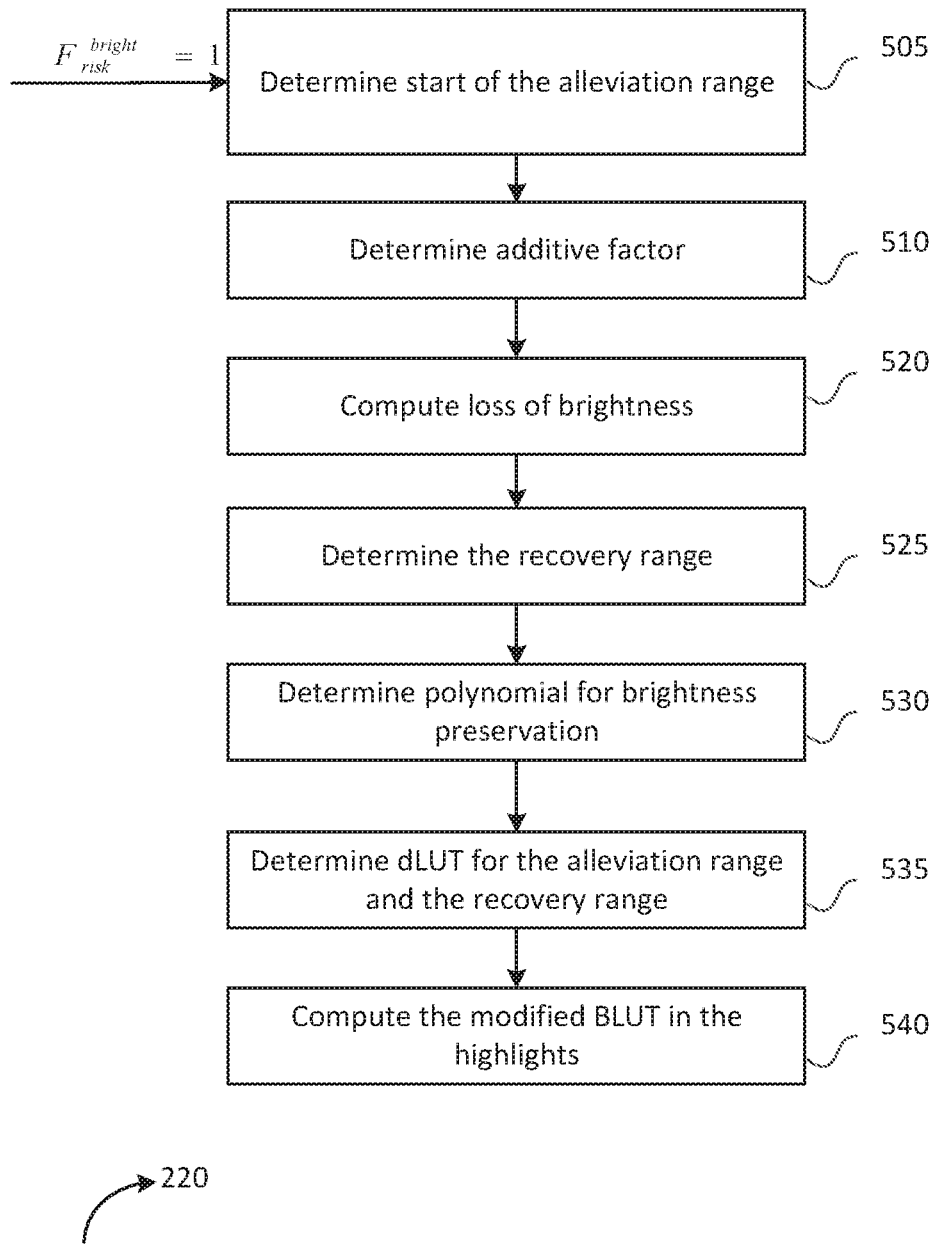
FIG. 5 depicts an example process to alleviate banding in highlight regions according to an embodiment of this invention.

If the flag $F_{risk}^{bright}$ is set (e.g., to 1), then a new BLUT is constructed in the highlights part to reduce banding while trying to maintain the average brightness. An example process is depicted in FIG. 5. The main idea is to locate the lowest banding-risk prone SDR codeword in the highlights part and start constructing the BLUT using the risk estimates from bottom to top, meaning, first one constructs the minimum required dLUT curve, followed by allocating the remaining codewords. During this process, the loss of overall image brightness as compared with the reference BLUT is monitored. The total loss in brightness in compensated by modifying the reference BLUT for the banding-risk-free SDR codewords.

Let $b_{mod\_min}^{bright}$ be the luma bin from which one starts modifying BLUT. Let $\delta b_{offset}^{bright}$ be a fixed number of bins that is being used as offset such that $$b_{mod\_min}^{bright} = \max\{b_{risk\_min}^{bright} - \delta b_{offset}^{bright}, b_{min}^{bright}\}. \quad (8)$$

Starting from step 505, the modified dLUT, $\delta_s^{MOD}$, will be built starting from $b_{mod\_min}^{bright}$, to be referred as the beginning of the alleviation part, until the highest intensity luma bin $b_{max}^{bright}$. Let $\beta = s_{b_{mod\_min}^{bright}}^L$ the starting SDR codeword of dLUT modification. Consider $\Delta_b^{bright}$, an additive variable parameter which changes linearly with bin index b between $\Delta_{min}^{bright}$ and $\Delta_{max}^{bright}$, the minimum and maximum values that $\Delta_b^{bright}$ can take. An example of computing $\Delta_b^{bright}$ (step 510) is depicted in Table 9. In an embodiment, typical values being used are $\Delta_{min}^{bright}=8$ and $\Delta_{max}^{bright}=16$. It appears that these values work well independently of the input min max bit-depth or the luma spatial resolution values.

TABLE 9

Example algorithm to compute additive factor for highlights

// set $\Delta_b^{bright}$ using $\Delta_{min}^{bright}$ and $\Delta_{max}^{bright}$ for highlight banding risk-prone bins
for (b = $b_{mod\_min}^{bright}$ ; b ≤ $b_{max}^{bright}$ ; b ++)

$$\Delta_b^{bright} = \Delta_{min}^{bright} + \frac{(\Delta_{max}^{bright} - \Delta_{min}^{bright})}{(b_{max}^{bright} - b_{mod\_min}^{bright})} \cdot (b - b_{mod\_min}^{bright})$$

end

The loss of overall image brightness is based ones, the luma histogram of $I_S$ (e.g., see Table 1). Using $h_s^{N_s}$, $\delta_s^{MOD}$ and $\delta_s^{REF}$ one can compute the loss of brightness for each adjusted codeword and add it up to keep track of overall brightness loss for the resulting HDR image. To improve computational efficiency, in an embodiment, $h_s^{(RC)}$, denoted as the reverse-cumulative histogram of the image, which is a derived statistic from $h_s^{N_s}$, is constructed. In an embodiment, the loss of brightness for codeword b is computed using the SDR histogram and the two reshaping functions as $h_s^{N_s} \cdot (T_s^{REF} - T_s^{MOD})$. The pre computed reverse-cumulative histogram obviates the need of constructing BLUT using dLUT for each codeword, that is, one can show that $h_s^{RC} \cdot (\delta_s^{REF} - \delta_s^{MOD}) = h_s^{N_s} \cdot (T_s^{REF} - T_s^{MOD})$. Given $h^{(RC)}$ defined as $$h_s^{(RC)} = \sum_{s}^{N_s-1} h_s^{N_s},$$

or $h_s^{(RC)} = h_{s+1}^{(RC)} + h_s^{N_s}$, where $h_{N_s-1}^{(RC)} = h_{N_s-1}^{N_s}$, an example algorithm for computing its values is depicted in Table 10.

TABLE 10

Computation of reverse-cumulative luma histogram

// construct the reverse-cumulative luma histogram of the SDR image
$h_{s_{max}^{bright}}^{(RC)} = h_{s_{max}^{bright}}^{N_s}$
for (s = $s_{max}^{bright} - 1$; s ≥ $s_{min}^{bright}$ ; s -- )
  $h_s^{(RC)} = h_{s+1}^{(RC)} + h_s^{N_s}$
end Alleviation Part: Let $\Phi$ denote the loss of average HDR brightness due to the difference in $\delta_s^{REF}$ and $\delta_s^{MOD}$. In step 535, the banding-free dLUT for the alleviation part may be computed using $R_b^V$, $\hat{\zeta}_b^V$ and $\Delta_b^{bright}$ for all SDR codewords s starting at s=β, as:

$$\delta_s^{MOD} = \frac{R_b^V}{\hat{\zeta}_b^V + \Delta_b^{bright}}. \quad (10)$$

In step 520, the loss of brightness for bin b ($\Phi_b$) is computed using $h_s^{(RC)}$ $\delta_s^{REF}$ $\delta_s^{MOD}$:

$$\Phi_b = \sum_{s=b^L}^{b^H} h_s^{RC} \cdot (\delta_s^{REF} - \delta_s^{MOD}), \quad (11)$$

and $$\Phi_b = \sum_{b=b_{mod\_min}^{bright}}^{b_{max}^{bright}} \Phi_b. \quad (12)$$

Recovery Part: In this part, $\Phi$ may be used as the target brightness budget for allocating additional HDR codewords in a recovery part, i.e., a set of bins just before the "alleviation part" that are used to compensate the brightness drop (step 525) (e.g., see FIG. 6B). Let γ be the beginning of this recovery part, that is, the SDR codeword from which one starts constructing $S_s^{MOD}$ till δ−1. γ is determined as a function of budget $\Phi$. Generally, for a higher budget, one needs a wider codeword range for compensation. Let $f_γ^s$ be the fraction of SDR codeword range to be used for compensation based on $\Phi$. The brightness recovery part: [γ, β) is constructed using a first order polynomial. The first order term is used in a decreasing fashion. Decreasing function is used considering that the recovery part should contribute less codewords as it approaches the banding risk alleviation part. Let the polynomial begin from γ with a maximum value, linearly decreasing to 0 at β−1:

$$\delta_s^{MOD} = a_0 + a_1(\beta - 1 - s) + \delta_s^{REF}. \quad (13)$$

Given the brightness budget and a look-up table one first obtains $f_γ^s$ using interpolation, then γ:

$$\gamma = \beta - f_γ^s \cdot (s_{max}^{bright} - \beta). \quad (14)$$

To recover the drop in overall brightness, the budget needs to obey the following equation:

$$\Phi = \sum_{s=\gamma}^{\beta-1} (\delta_s^{MOD} - \delta_s^{REF}) \cdot h_s^{RC} = \sum_{s=\gamma}^{\beta-1} [a_0 + a_1 \cdot (\beta - 1 - s)] \cdot h_s^{RC}. \quad (15)$$

The parameters $a_0$, $a_1$ need to be computed using the codeword budget (see step 530). Assuming half the budget is to be consumed by the constant term ($a_0$) and the other half by the first-order term ($a_1$), then:

$$\frac{\Phi}{2} = \sum_{s=\gamma}^{\beta-1} a_0 \cdot h_s^{RC} \Rightarrow \frac{\Phi}{2} = a_0 \sum_{s=\gamma}^{\beta-1} h_s^{RC} \Rightarrow a_0 = \frac{\left(\frac{\Phi}{2}\right)}{\sum_{s=\gamma}^{\beta-1} h_s^{RC}}, \quad (16a)$$

and $$\frac{\Phi}{2} = \sum_{s=\gamma}^{\beta-1} a_1 \cdot (\beta-1-s) \cdot h_s^{RC} \Rightarrow a_1 = \frac{\left(\frac{\Phi}{2}\right)}{\sum_{s=\gamma}^{\beta-1} (\beta-1-s) \cdot h_s^{RC}}. \quad (16b)$$

Using $a_0$, $a_1$ one may construct $\delta_s^{MOD}$ for the brightness recovery part according to equation (13). An example of the whole process is depicted in Table 11.

TABLE 11

Example process to reduce banding artifacts in the highlights

// $\Phi = 0$
// set look-up table and a method to obtain fractional codeword range for compensation
$\Phi_{base} = [100, 1000, 10000, 100000]$ $P_{ratio} = \frac{P}{(1920 \cdot 1080)}$ // ratio of number of image luma pixels to HD $\Phi = P_{ratio} \cdot \Phi_{base}$
$f_\gamma^s = [0.5, 1, 2, 3]$
// construct banding-alleviating dLUT for alleviation part
for (b = $b_{mod\_min}^{bright}$ ; b ≤ $b_{max}^{bright}$ ; b++)
  Use Table 9 to determine $\Delta_b^{bright}$ $$\delta_s^{MOD} = \frac{R_b^V}{\xi_b^V + \Delta_b^{bright}}$$

// construct dLUT for each codeword in bin
  for (s = $b^L$ ; s ≤ $b^H$ ; s++)
  // use HDR range, required number of codewords and the additive parameter
    $\Phi = \Phi + h_s^{RC} \cdot (\delta_s^{REF} - \delta_s^{MOD})$
  end
end
// compute starting SDR codeword for dLUT modification
$f_\gamma^s$ = interpolate_table_lookup ($\Phi$, $f_\gamma^s$, $\Phi$)
$\gamma = \beta - f_\gamma^s \cdot (s_{max}^{bright} - \beta)$
// compute $a_0$, $a_1$ that satisfy $\Phi$ $$a_0 = \frac{\left(\frac{\Phi}{2}\right)}{\sum_{s=\gamma}^{\beta-1} h_s^{RC}}$$

$$a_1 = \frac{\left(\frac{\Phi}{2}\right)}{\sum_{s=\gamma}^{\beta-1} [h_s^{RC} \cdot (\beta-1-s)]}$$

// brightness compensating dLUT construction[2] in recovery part
for (s = $\gamma$ ; s < $\beta$; s++)
  $\delta_s^{MOD}$ = min{[$a_0 + a_1 \cdot (\beta-1-s)$], (0.$\delta_s^{REF}$)} + $\delta_s^{REF}$
end
// construct BLUT based on dLUT using different codeword regions
// no change in BLUT
for (s = $_{min}^{bright}$ ; s ≤ $\gamma$ ; s ++)
  $T_s^{MOD} = T_s^{REF}$
end
// recovery region TABLE 11-continued Example process to reduce banding artifacts in the highlights

```
for (s = γ+1; s ≤ β; s ++)
    T_s^MOD = T_{s-1}^MOD + δ_{s-1}^MOD
end
// alleviation region
for (s = β+1; s ≤ s_max^bright ; s++)
    T_s^MOD = T_{s-1}^MOD + δ_{s-1}^MOD
end
// non-signal range
for (s = s_max^bright + 1 ; s ≤ N^s ; s ++)
    T_s^MOD = T_s^REF
end
```

[2]Note that θ = 1.2 is the maximum dLUT-multiplier, as described in dark banding reduction algorithm. Due to this max-clipping, the brightness may not be preserved for some cases.

Figure 6A:
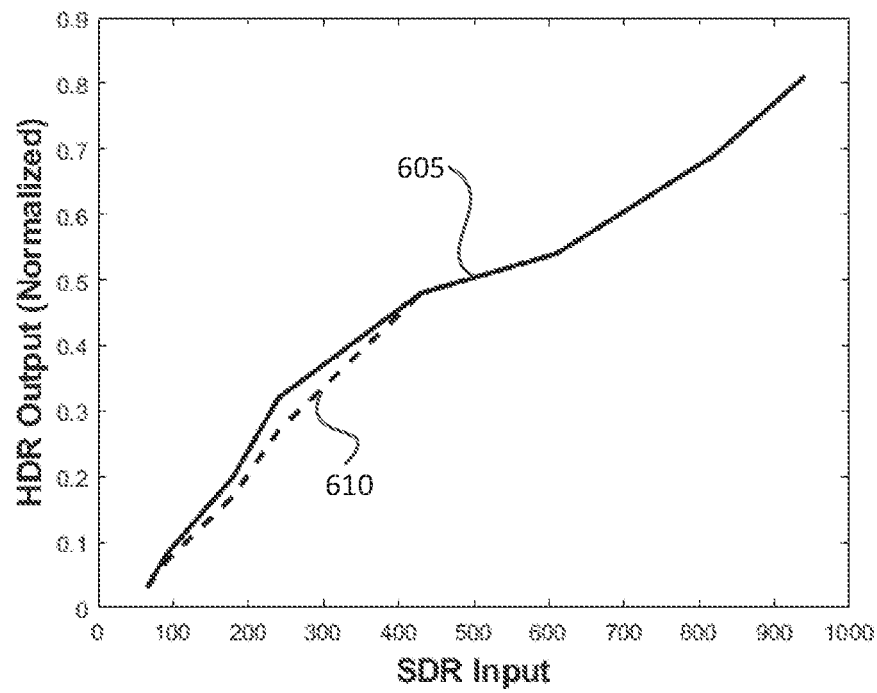
FIG. 6A depicts examples of an original BLUT and a modified BLUT to reduce banding in the darks according to an embodiment of this invention.

FIG. 6A depicts an example of an original BLUT (605) and a modified BLUT (610) generated according to an embodiment to adjust for potential banding artifacts in the darks.

Figure 6B:
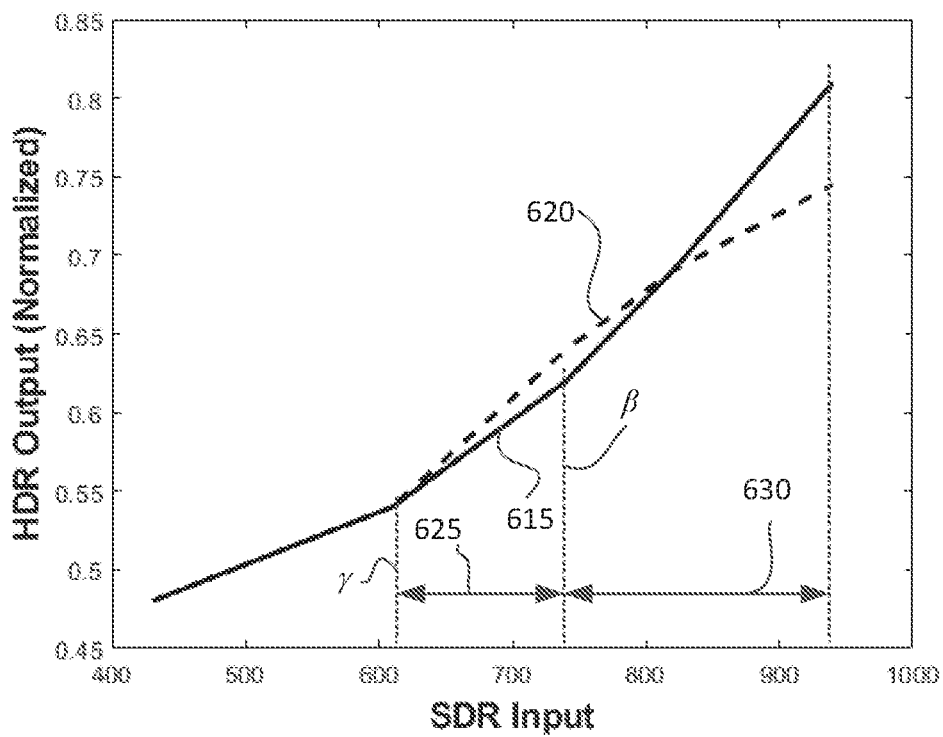
FIG. 6B depicts examples of an original BLUT and a modified BLUT to reduce banding in the highlights according to an embodiment of this invention.

FIG. 6B depicts an example of an original BLUT (615) and a modified BLUT (620) generated according to an embodiment to adjust for potential banding artifacts in the highlights. In FIG. 6B, region 625 denotes the recovery range (starting at γ) and region 630 denotes the alleviation range (starting at β).

As noted in FIG. 2, process 200 applies separate banding alleviation algorithms in the darks and the highlights. In an embodiment, when both steps are needed, the dark banding alleviation step (215) is applied before applying the highlights alleviation step (220). Thus, if both steps are needed, step 220 is applied to the modified BLUT (217) generated by step 215 to generate modified BLUT 222. If step 215 is skipped, then step 220 is applied to the original BLUT 204 to generate modified BLUT 222. If step 220 is skipped, the input to step 225 is the output of step 215, BLUT 217, otherwise it is BLUT 222. In some embodiments, the output of the banding alleviation blocks 215 and 220 may be further filtered or smoothed by block 225 to generate the final output BLUT 227. Examples of such BLUT post-processing may be found in U.S. Provisional Patent Application Ser. No. 62/636,388, "Linear Encoder for Image/Video Processing," by N. J. Gadgil and G-M. Su, filed on Feb. 28, 2018, and incorporated herein by reference.

In an embodiment, the process 200 for reducing banding artifacts is performed in an encoder (e.g., as part of the encoder depicted in FIG. 1A). In such a scenario, the updated backward reshaping function 227 (shown in FIG. 2) will replace the one generated by block 150, and its coded representation will be send downstream to a decoder as metadata 152.

In another embodiment, the process 200 may be performed in a decoder (e.g., as part of the decoder depicted in FIG. 1B). In such a scenario, SDR input 202 shown with reference to FIG. 2 will represent the reconstructed SDR output 156, shown with reference to FIG. 1B after decompression, and input BLUT 204 shown with reference to FIG. 2 will represent the BLUT generated based on the input metadata (152). After the completion of process 200 of FIG. 2, the input BLUT will be replaced by the modified BLUT 227, which will be used in the decoder of FIG. 1B in step 158 to reconstruct the banding-free reconstructed HDR signal 160.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to reducing banding artifacts, such as those described herein. The computer and/or IC may compute, any of a variety of parameters or values that relate to reducing banding artifacts as described herein. The image and video dynamic range extension embodiments may be implemented in hardware, software, firmware and various combinations thereof.

Certain implementations of the invention comprise computer processors which execute software instructions which cause the processors to perform a method. For example, one or more processors in a display, an encoder, a set top box, a transcoder or the like may implement reducing banding artifacts methods as described above by executing software instructions in a program memory accessible to the processors An embodiment may also be provided in the form of a program product. The program product may comprise any non-transitory and tangible medium which carries a set of computer-readable signals comprising instructions which, when executed by a data processor, cause the data processor to execute a method of an embodiment of the invention. Program products according to an embodiment of the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to reducing banding artifacts for HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the embodiments of the present invention may be appreciated from the following enumerated example embodiments (EEEs):

1. In an encoder or a decoder comprising one or more processors, a method for reducing banding artifacts, the method comprising:
receiving an input backward reshaping function (204) (BLUT) mapping codewords from a first dynamic range to a second dynamic range, wherein the second dynamic range is equal or higher than the first dynamic range;
receiving an input image (202) in the first dynamic range;
generating (205) statistical data based on the input image and the input backward reshaping function to estimate the risk of banding artifacts in a target image in the second dynamic range, wherein the target image is generated by applying the input backward reshaping function to the input image;
dividing the first dynamic range into codeword bins;
dividing the first dynamic range into a darks range and a highlights range;
computing (210) banding risk values for the bins in the darks range and the bins in the highlights range based on the statistical data, and if a banding risk value in at least one of the darks range or the highlights range is positive, applying a darks-banding alleviation function (215) and/or a highlights-banding alleviation function (220) to generate an output backward reshaping function based on the statistical data and the input backward reshaping function; and
replacing the input backward reshaping function with the output backward reshaping function.

2. The method of EEE 1 or 2, wherein the input image comprises a standard-dynamic range image and the target image comprises a high dynamic range image.

3. The method of any preceding EEE, wherein generating statistical data based on the input image and the input backward reshaping function (BLUT) comprises:
computing a histogram of luminance values in the input image;
dividing the input image into non-overlapping blocks;
computing block-based standard deviations of the luminance values for one or more of the image blocks;
computing bin-based standard deviation values for each bin in the first dynamic range based on the block-based standard deviations;
computing normalized bin-based standard deviation values for each bin based on the histogram of luminance values and the bin-based standard deviation values;
for each bin in the first dynamic range, computing its normalized range in the second dynamic range based on the input BLUT;
and generating bin-based estimates of luminance standard deviation values in a reconstructed image in the second dynamic range by scaling the normalized bin-based standard deviation values based on the bin's normalized range in the second dynamic range.

4. The method of EEE 3, wherein computing the banding risk values comprises:
for each bin in the first dynamic range:
computing a first value, the first value estimating a lower number of codewords required to properly reconstruct an image in the second dynamic range with no banding, wherein the estimate is based on the bin's estimated luminance standard deviation in the second dynamic range;
computing a second value, the second value computing the number of allocated codewords in the second dynamic range for the bin; and
computing the banding risk value for the bin by subtracting the second value from the first value.

5. The method of any preceding EEE wherein applying the darks-banding alleviation function comprises:
for each bin in the darks range,
if the banding risk value for the bin is positive, then reducing the slope of the input BLUT.

6. The method of EEE 5, wherein the slope of the input BLUT is reduced based on a multiplier factor $$\alpha_{risk}^{dark} = \frac{N_b^{CW}}{\hat{\zeta}_b^V + \Delta_{BR}^{dark}},$$

where $N_b^{CW}$ denotes the number of codewords in the input image in bin b, $\hat{\zeta}_b^V$ denotes an estimate of required codewords in bin b to avoid banding, and $\Delta_{BR}^{dark}$ denotes a first constant representing a safety margin of codewords added to $\hat{\zeta}_b^V$ to reduce banding in the darks.

7. The method of EEE 5, further comprising:
adjusting the slope of the input BLUT for each bin for which the sum of the banding risk value and a second constant is lower or equal to zero.

8. The method of EEE 7, wherein the slope of the input BLUT is adjusted based on a multiplier factor $$\alpha_{recovery}^{dark} = \min\left(\frac{N_b^{CW}}{\hat{\zeta}_b^V + \Delta_{CM}^{dark}}, \theta\right),$$

where $N_b^{CW}$ denotes the number of codewords in the input image in bin b, $\hat{\zeta}_b^V$ denotes an estimate of required codewords in bin b to avoid banding, $\Delta_{CM}^{dark}$ denotes the second constant representing a safety margin of codewords added to $\hat{\zeta}_b^V$ to reduce banding in the darks, and $\theta$ denotes a small constant value.

9. The method of EEE 7, wherein no adjustment is made to the slope of the input BLUT within a bin, if the banding risk value for the bin is negative and the sum of the banding risk value for the bin added to the second constant value is larger than zero.

10. The method of any preceding EEE, wherein applying the highlights-banding alleviation function comprises:
determining a start value of an alleviation range within the highlights range based on the smaller bin value in the highlights range with a positive banding risk value;
adjusting the slope of an existing BLUT within the alleviation range;

determining a loss-of-brightness value due to the adjustment of the slope of the existing BLUT in the alleviation range;

determining a start value for a recovery range spanning bins in the first dynamic range between the start value of the first dynamic range and the start value of the alleviation range;

determining a polynomial for brightness preservation based on the loss of brightness value; and adjusting the slope of the existing BLUT within the recovery range based on the polynomial for brightness preservation, wherein if the darks-alleviation function is not applied in the darks-region, then the existing BLUT comprises the input BLUT;

else the existing BLUT function comprises an output BLUT generated by the darks-alleviation function.

11. The method of EEE 10, wherein the existing BLUT for a bin b within the alleviation range is adjusted according to the added factor $$\delta_s^{MOD} = \frac{R_b^V}{\hat{\zeta}_b^V + \Delta_b^{bright}},$$

where $\hat{\zeta}_b^V$ denotes an estimate of required codewords in bin b to avoid banding, $\Delta_b^{bright}$ denotes a constant representing a safety margin of codewords added to $\hat{\zeta}_b^V$ to avoid banding in the highlights, and $R_b^V$ denotes a normalized range value in the second dynamic range corresponding to bin b in the first dynamic range.

12. The method of EEE 10, wherein the existing BLUT for codewords within the recovery range is adjusted according to the added factor $$\delta_s^{MOD} = a_0 + a_1(\beta - 1 - s) + \delta_s^{REF},$$

wherein β denotes the start value of the alleviation range, $\delta_s^{REF}$ denotes the slope of the existing BLUT, $a_0$ and $a_1$ are polynomial coefficients determined based on the loss of brightness value, and s denotes a codeword within the recovery range.

13. The method of EEE 12, wherein the existing BLUT is adjusted in the recovery range as:

for (s=γ+1; s≤β; s++)

$$T_s^{MOD} = T_{s-1}^{MOD} + \delta_{s-1}^{MOD},$$

where $T_s^{MOD}$ denotes the modified BLUT value corresponding to input codeword s, and γ denotes the start value of the recovery range.

14. The method of any one of EEEs 11 to 13, wherein the existing BLUT is adjusted in the alleviation range as:

for (s=β+1; s≤$s_{max}^{bright}$; s++)

$$T_s^{MOD} = T_{s-1}^{MOD} + \delta_{s-1}^{MOD},$$

where $T_s^{MOD}$ denotes the modified BLUT value corresponding to input codeword s, β denotes the start value of the alleviation range, and $s_{max}^{bright}$ denotes the maximum luminance range in the input image.

15. A non-transitory computer-readable storage medium having stored thereon computer-executable instructions for executing with one or more processors a method in accordance with EEEs 1-14.

16. An apparatus comprising a processor and configured to perform any one of the methods recited in EEEs 1-14.

What is claimed is:

1. A method for reducing banding artifacts in a target image, the method comprising:

receiving an input backward reshaping function (BLUT) mapping codewords from a first dynamic range to a second dynamic range, wherein the second dynamic range is equal or higher than the first dynamic range;

receiving an input image in the first dynamic range;

generating statistical data based on the input image and the input backward reshaping function, wherein generating statistical data comprises:

computing bin-based standard deviations from a histogram of luminance values in the input image;

for each bin of luminance values in the first dynamic range, computing a normalized second dynamic range using the input backward reshaping function, and mapping the computed bin-based luminance standard deviations from the first dynamic range to the second dynamic range using a statistical transfer equation based on the computed normalized second dynamic range and the computed bin-based standard deviations, to generate estimates of bin-based luminance standard deviation values in a reconstructed image in the second dynamic range, wherein the target image is generated by applying the input backward reshaping function to the input image;

dividing the first dynamic range into codeword bins;

dividing the first dynamic range into a darks range and a highlights range;

computing banding risk values representing a chance of having banding artifacts for the bins in the darks range and the bins in the highlights range based on a difference between a first value and a second value, wherein, for each codeword bin, the first value is estimating a lower number of codewords required to properly reconstruct an image in the second dynamic range with no banding, wherein, for each codeword bin, the lower number of codewords required to properly reconstruct an image in the second dynamic range with no banding is estimated by linear interpolation of experimental mapping data with the estimated luminance standard deviation value for the codeword bin, wherein the experimental mapping data maps the luminance standard deviation and the lower number of codewords for the full second dynamic range, and the second value is computed as the number of allocated codewords in the second dynamic range for the bin; and generating an output backward reshaping function by:

adjusting a slope of the input backward reshaping function for the codeword bins in the darks range for which the difference is positive, for reducing the banding artifacts in the darks, wherein adjusting the slope of the input backward reshaping function in the darks range comprises:

for each bin in the darks range, if the difference for the bin is positive, then reducing the slope of the input backward reshaping function (BLUT), wherein the slope of the input backward reshaping function (BLUT) is reduced based on a multiplier factor $$\alpha_{risk}^{dark} = \frac{N_b^{CW}}{\hat{\zeta}_b^V + \Delta_{BR}^{dark}},$$

where $N_b^{CW}$ denotes the number of allocated codewords in bin b, $\hat{\zeta}_b^V$ denotes an estimate of required codewords in bin b to avoid banding, and $\Delta_{BR}^{dark}$ denotes the number of codewords to be added to $\hat{\zeta}_b^V$ to reduce the banding risk value in the darks bin and compensating the adjusted slope of the input backward reshaping function for the bins in the darks range for which the difference is not positive, by reallocating the remaining codewords in the bin where the slope of the input backward reshaping function has been adjusted to the bins for which the difference is not positive; and replacing the input backward reshaping function with the output backward reshaping function.

2. The method of claim 1, wherein the input image comprises a standard-dynamic range image and the target image comprises a high dynamic range image.

3. The method of claim 1, wherein, if the difference in a full range of the target image is positive, then the output backward reshaping function is generated.

4. The method of claim 1, wherein, if the difference in a full range of the target image is not positive, then the step of generating the output backward reshaping function is skipped.

5. The method of claim 1, wherein the luminance values are grouped in bins and the standard deviations are computed for each bin.

6. The method of claim 1, wherein computing standard deviations of luminance values in the input image comprises:
    computing a histogram of luminance values in the input image;
    dividing the input image into non-overlapping blocks;
    computing block-based standard deviations of the luminance values for one or more of the image blocks;
    computing bin-based standard deviation values for each bin in the first dynamic range based on the block-based standard deviations;
    computing normalized bin-based standard deviation values for each bin based on the histogram of luminance values and the bin-based standard deviation values.

7. The method of claim 1, wherein generating statistical data further comprises scaling the normalized bin-based standard deviation values for converting to a full second dynamic range.

8. The method of claim 1, wherein compensating the adjusted slope of the input backward reshaping function in the darks range comprises:
    compensating the slope of the input backward reshaping function (BLUT) for each bin for which the sum of the difference and a second constant is lower or equal to zero.

9. The method of claim 8, wherein the slope of the input backward reshaping function (BLUT) is compensated based on a multiplier factor $$\alpha_{recovery}^{dark} = \min\left(\frac{N_b^{CW}}{\hat{\zeta}_b^V + \Delta_{CM}^{dark}}, \theta\right),$$

where $N_b^{CW}$ denotes the number of codewords in the input image in bin b, $\hat{\zeta}_b^V$ denotes an estimate of required codewords in bin b to avoid banding, $\Delta_{CM}^{dark}$ denotes the second constant representing a safety margin of codewords added to $\hat{\zeta}_b^V$ to reduce banding in the darks, and $\theta$ denotes a small constant value.

10. The method of claim 8, wherein no adjustment is made to the slope of the input backward reshaping function (BLUT) within a bin, if the difference for the bin is negative and the sum of the difference for the bin added to the second constant value is larger than zero.

11. The method of claim 1, wherein adjusting the slope of the input backward reshaping function in the highlights range comprises:
    determining a start value of an alleviation range within the highlights range based on the smaller bin value in the highlights range with a positive difference;
    adjusting the slope of an existing backward reshaping function (BLUT) within the alleviation range.

12. The method of claim 11, wherein compensating the adjusted slope of the input backward reshaping function in the highlights range comprises:
    determining a loss-of-brightness value due to the adjustment of the slope of the existing backward reshaping function (BLUT) in the alleviation range;
    determining a start value for a recovery range spanning bins in the first dynamic range between the start value of the first dynamic range and the start value of the alleviation range;
    determining a polynomial for brightness preservation based on the loss of brightness value; and
    adjusting the slope of the existing backward reshaping function (BLUT) within the recovery range based on the polynomial for brightness preservation.

13. The method of claim 12, wherein
    if the slope of the input backward reshaping function in the darks range is not adjusted, then the existing backward reshaping function (BLUT) comprises the input backward reshaping function;
    else the existing backward reshaping function comprises the output backward reshaping function generated for the codeword bins in the darks range.

14. The method according to claim 11, wherein the existing backward reshaping function (BLUT) for a bin b within the alleviation range is adjusted according to the added factor $$\delta_s^{MOD} = \frac{R_b^V}{\hat{\zeta}_b^V + \Delta_b^{bright}},$$

where $\hat{\zeta}_b^V$ denotes an estimate of required codewords in bin b to avoid banding, $\Delta_b^{bright}$ denotes a constant representing a safety margin of codewords added to $\hat{\zeta}_b^V$ to avoid banding in the highlights, and $R_b^V$ denotes a normalized range value in the second dynamic range corresponding to bin b in the first dynamic range.

15. The method according to claim 11, wherein the existing backward reshaping function (BLUT) for codewords within the recovery range is adjusted according to the added factor $$\delta_s^{MOD} = a_0 + a_1(\beta - 1 - s) + \delta_s^{REF},$$

wherein $\beta$ denotes the start value of the alleviation range, $\delta_s^{REF}$ denotes the slope of the existing backward reshaping function (BLUT), $a_0$ and $a_1$ are polynomial coefficients determined based on the loss of brightness value, and s denotes a codeword within the recovery range.

16. The method of claim 15, wherein the existing backward reshaping function (BLUT) is adjusted in the recovery range as:
    for (s=$\gamma$+1; s≤$\beta$; s++)

$$T_s^{MOD} = T_{s-1}^{MOD} + \delta_{s-1}^{MOD},$$

where $T_s^{MOD}$ denotes the adjusted backward reshaping function (BLUT) value corresponding to input codeword s, and y denotes the start value of the recovery range.

17. The method of claim 14, wherein the existing backward reshaping function (BLUT) is adjusted in the alleviation range as:

for (s=β+1; s≤$s_{max}^{bright}$; s++)

$$T_s^{MOD} = T_{s-1}^{MOD} + \delta_{s-1}^{MOD},$$

where $T_s^{MOD}$ denotes the modified backward reshaping function (BLUT) value corresponding to input codeword s, β denotes the start value of the alleviation range, and $s_{max}^{bright}$ denotes the maximum luminance range in the input image.

18. The method according to claim 1, wherein the input backward reshaping function (BLUT) is a monotonically non-decreasing function.

19. An apparatus comprising a processor and configured to perform the method recited in claim 1.

20. A non-transitory computer-readable storage medium having stored thereon computer-executable instructions for executing with one or more processors a method in accordance with claim 1.

* * * * *